UNITED STATES PATENT OFFICE.

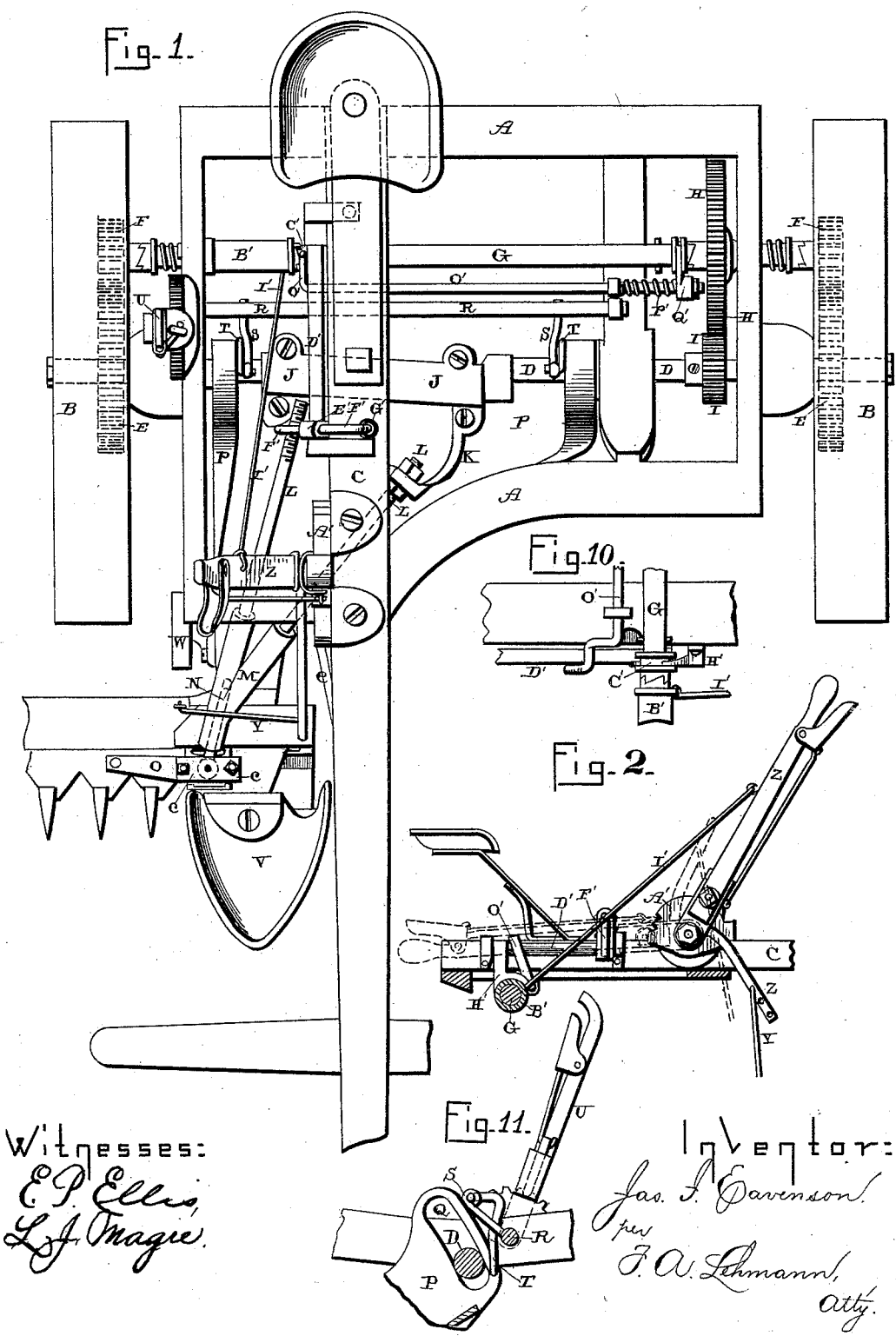

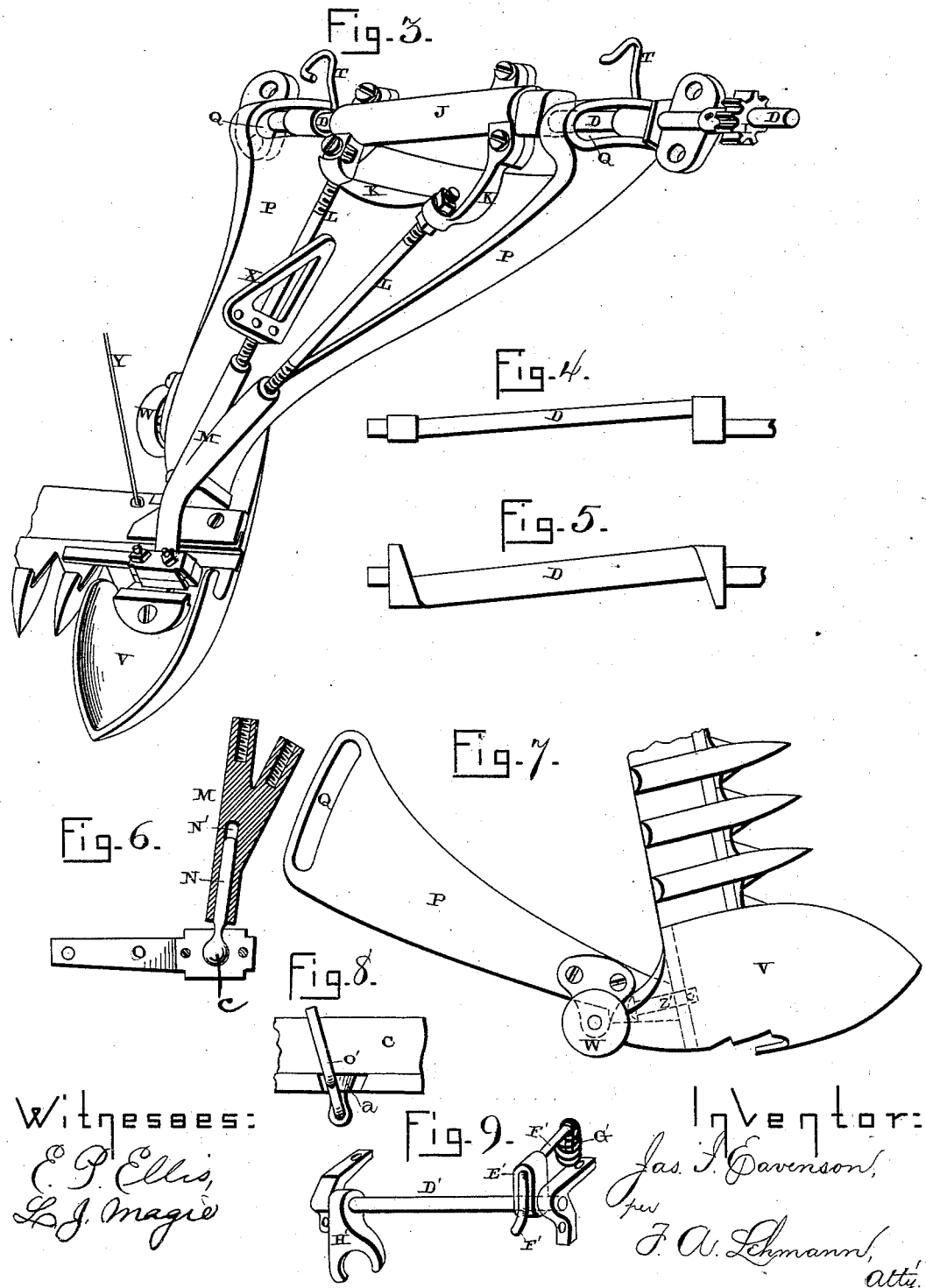

JAMES I. EAVENSON, OF DUGDALE, PENNSYLVANIA.

MOWER.

SPECIFICATION forming part of Letters Patent No. 423,314, dated March 11, 1890.

Application filed November 2, 1889. Serial No. 329,001. (No model.)

*To all whom it may concern:*

Be it known that I, JAMES I. EAVENSON, of Dugdale, in the county of Chester and State of Pennsylvania, have invented certain new and useful Improvements in Mowers; and I do hereby declare the following to be a full, clear, and exact description of the invention, such as will enable others skilled in the art to which it pertains to make and use it, reference being had to the accompanying drawings, which form part of this specification.

My invention relates to an improvement in mowers; and the objects of my invention are to form a crank directly upon the axle, which may extend wholly or only partially across the frame and through the wheels, and to place upon this cranked portion of the axle a box to which the driving-arm is attached; to pivot the shoe to a casting or frame which is adjustable at its rear end, whereby the cutting apparatus is adjusted to a high or low cut; to attach to the lower end of the frame or casting a small ground-wheel which serves as a fulcrum upon which the frame or casting and the shoe turns, and which is always in position for use; to connect the driving-arm to the cutter by means of a ball-and-socket joint, which may be formed as a part of the arm or separately, as may be desired; to form the operating-arm of a number of pieces, so that its angle to the operating-crank can be changed so as to make the points of the knife move just opposite to the center of the guards, and to provide an automatic mechanism by means of which the cutting apparatus can be raised to any desired height, so as to pass over obstructions or be folded.

Figure 1 is a plan view of a mower which embodies my invention. Fig. 2 is a detail view cutting a portion of the machine in two, so as to show the mechanism for raising and folding the cutting apparatus. Fig. 3 is a perspective of the crank, the driving-arm, and the shoe. Fig. 4 is a detail view of the crank-shaft. Fig. 5 shows a shaft which may be used if so desired. Fig. 6 shows the connection between the driving-arm and the heel of the finger-bar. Fig. 7 is a detail view showing the wheel which is attached to the slotted frame. Figs. 8 and 9 are details of the mechanism for operating the clutch. Fig. 10 is an inverted detail view showing the clutch and its operating mechanism for operating the drum. Fig. 11 is a detail view showing the lever which operates the frame P.

A represents the main frame, which may be of any desired shape, size, or construction that may be preferred, B the two driving-wheels, and C the tongue, all of which may be arranged in any way that may be preferred. The axle D is preferably constructed as shown in Fig. 4, and may extend entirely through the main frame A and the driving-wheels B, or, as in the present instance, may be made to extend only through the main frame. Both of the driving-wheels B are placed upon short axles, and secured to the hubs of the wheels are the gear-wheels E, which mesh with the pinions F upon the shaft G, which extends through the main frame at both ends. Both of the pinions F are provided with ratchets in the usual manner, so that when both of the wheels are being backed this shaft G will not be operated.

Placed upon the shaft G is the wheel H, which is provided with a ratchet, and which meshes with a small pinion I upon the shaft D. By means of this construction both of the wheels B are made to drive the axle D, so that if one of the wheels is backing and the other moving forward the motion of the axle will be continued. These parts are of the ordinary construction, such as are now used in mowers.

Upon the crank of the shaft D is placed the box J, as shown in Fig. 3, and through which the cranked portion of the axle only passes. To the upper portion of this box J is secured the curved arm K, which is connected to both of the ends of the box, and through which the screw-threaded rods L of the driving-arm pass. The lower front ends of these rods L are screwed into the casting M, which is preferably given the shape as shown in Figs. 3 and 6, and which may have a ball-joint formed upon its lower end, but in this instance is shown as having a recess into which the ball-joint N is placed. The recess N' is made slightly longer or deeper than the rod N, on which the ball is formed, so that the rod can have a slight back-and-forth movement, so as to prevent binding while the mower is in operation.

When it is desired to adjust the knife so that its points will come just opposite the center of the guards, the right-hand rod L is lengthened or shortened, so as to change the angle at which the driving-arm shall extend, and thus move the cutter-bar slightly to the right or left, as may be preferred. It will be seen from the above that this driving-arm L is operated directly from the crank on the axle D, and that this arm can be changed by simply adjusting a single rod, so as to regulate the cutter. Upon the heel O of the cutter-bar is formed a ball box or socket c, into which the ball on the lower end of the rod N fits. As this driving-arm is moved back and forth the cutter-bar is made to reciprocate with the least possible friction and with the fewest possible parts.

Placed upon the axle D is a triangular-shaped frame or casting P, which is provided with the curved slots Q at its rear ends, so as to fit over the axle D, and which frame has a rising-and-falling movement for the purpose of regulating the pitch or angle at which the cutting apparatus shall extend. For the purpose of supporting and operating the rear end of this frame P, a small shaft R is journaled in the frame A, and to this shaft are connected the arms S, from which the hangers or rods T are fastened. The lower ends of these hangers or rods T are fastened to the frame P.

To the outer end of the shaft R is connected the operating-lever U, which is provided with the usual spring-pawl for engaging with a ratcheted segment for the purpose of holding the shaft R and the frame P in any desired position. This lever U projects up within easy reach of the driver upon his seat, so that he can raise or lower the rear end of the frame P at will. Pivoted to the lower end of this frame or casting P is the shoe V, of ordinary construction, and which freely turns upon its pivot Z' upon the lower end of the frame P, so that the cutting apparatus and the shoe can be turned upward in the usual manner without affecting the frame in the slightest. While the shoe does not affect the frame P, the shoe has its angle changed each time that the rear end of the frame P is raised or lowered by the lever U. If a high cut is desired, the lever U is moved so as to lower the frame P at its rear end, and this frame P, turning upon the small wheel W, which is journaled upon its lower end, causes the cutting apparatus to be raised at its front edge. If a low cut is desired, the rear end of the frame P is raised, and this movement causes the cutting apparatus to be turned downward at its front edge.

The wheel W (shown more especially in Figs. 3 and 7) projects below the lower front end of the frame P any desired distance and serves as a fulcrum upon which the frame P turns. This wheel not only supports the front end of the frame P, but also regulates the distance that the shoe V shall drop downward. When the cutting apparatus and shoe are partially raised, this wheel W remains in contact with the earth and is always in its proper position. Where the wheel is connected to the shoe and the cutting apparatus is partially raised, this wheel has its inner end strike against the ground as the cutting apparatus falls, and a great strain is always brought to bear upon its pivot or journal in consequence of it. When the front end of the frame P is raised, as when the cutting apparatus is folded, the wheel W is raised above the ground, but is in position to strike squarely upon it when the cutting apparatus is returned to position.

Upon the top of the casting P is formed a lug X, either of the shape here shown or any other that may be preferred, and which is provided with a suitable number of perforations, so that the draft-rod e, which has its front end fastened to the doubletree in the usual manner, can be raised and lowered at its rear end, according to the height of the animals used. If tall animals are used, the rear end of the draft-rod will be fastened to the highest openings in the lug; but if medium-sized animals are used this rear end will be lowered, so as to give a more direct draft and assist in taking the weight of the machine from the horses' necks.

Fastened to the heel-end of the finger-bar, outside of its hinge or pivot, is a rod Y, which extends up and is fastened to the lower projecting end of the operating-lever Z, pivoted upon suitable castings upon the tongue, and by means of which the front end of the frame P and the cutting-apparatus are raised. The casting A', upon which this lever Z is pivoted, is provided with a suitable number of teeth at its rear end, and with which a spring-dog connected with the lever Z engages for the purpose of holding the front end of the frame and the cutter-bar in a folded position. This lever is intended to be operated in the usual manner by the driver.

In order to have the forward draft of the team raise the cutting apparatus or fold it entirely, there is placed upon the shaft G a loosely-revolving drum B', which can be locked to the shaft G, when so desired, by means of a ratchet or friction clutch C'. This clutch is placed upon the shaft G and has its ends so shaped as to engage with the drum B', when it is moved in contact therewith, by means of the lever H' on the rock-shaft D', which rock-shaft is journaled upon the side of the rear end of the tongue.

Projecting upwardly from the front end of the rock-shaft D' is an arm E', through which the bent spring-actuated rod F' passes. This rod F' has its rear end turned downward inside of the spring G', which has its lower end placed in a suitable socket formed in the top of the tongue, so that that portion of the rod which projects across the top of the tongue is always held by the spring in a raised position, and is thus made to turn the rock-shaft D' partially around, so that the forked arm or lever H', which extends downward from its rear end and engages a groove in the clutch, will force the sliding clutch C' out of contact with the drum B'. The clutch C', of ordinary construction, is placed upon the shaft G for the purpose of causing the drum B' to revolve therewith, and is grooved in its outer surface, so that the lever H' can engage with it for the purpose of moving the clutch in and out of gear with the drum. This lever H' is secured rigidly to the rock-shaft and is forked at its lower end, so as to straddle over the top of the clutch. When the driver places his foot upon this rod F', the rock-shaft D' is caused to partially revolve in its bearings, and causing the arm H' to force the clutch C' in gear with the drum, and thus cause the drum to revolve with the shaft G for the purpose of wrapping around it the wire, cord, or chain I', which is fastened at its front end to the operating-lever Z. As soon as the driver removes his foot from this rod F' the spring G' causes the rock-shaft to partially revolve and throw the clutch C' out of gear, and then all further movement of the drum ceases and the cutting apparatus falls. The outer end of the rod F' projects beyond the arm or lever E', which projects upwardly from the shaft D', and is so shaped that when the lever Z is forced backward by the driver or drawn backward by the operating wire, cord, or chain I' the rear edge of the lever Z will strike this outer bent end of the rod F', and thus operate the rock-shaft D' so as to throw the clutch C' out of gear.

As the machine is moving forward and an obstruction of any kind is encountered the driver has but to press his foot upon the rod or lever F', when the rock-shaft D' will throw the clutch into gear with the drum, and the drum revolving with the shaft G will cause the cord, wire, or chain I' to be wrapped around the drum, thus drawing the operating-lever Z backward by the draft of the team, so as to raise the cutting apparatus sufficiently high to pass over any ordinary obstruction. As soon as the cutting apparatus has been raised sufficiently high the driver has but to remove his foot from the rod or lever F', when the drum will be released, and then the cutting apparatus will drop from its own weight. If the driver desires to fold the cutter-bar, instead of simply raising it, he has but to allow the pressure of his foot upon the rod or lever F' to continue, and then the operating-lever Z will be drawn backward by the cord, wire, or chain I' until the rear edge of the lever Z strikes against the bent end of the rod or lever F', when the shaft D' will be drawn out of gear, and the dog upon the lever Z, engaging with the teeth in the casting A' will hold the parts in a folded position. By this construction the drum is automatically thrown out of operation as soon as the lever Z is drawn backward its full extent.

As the cutter will not operate if it has been raised beyond a certain angle, it becomes necessary to throw the wheel H out of gear with the shaft G, so that this wheel H will not operate the shaft D through the pinion I. For this purpose an endwise-moving rod O', having a spring P' and an arm Q' upon one end, is placed upon the frame almost parallel with the shaft G. The arm Q' engages with the movable clutch-section on the shaft G, and serves to cause the shaft G to be operated or not by the wheel H. That end of the rod O' which is next to the driver's seat is turned upward and is made to pass over a projection a, formed upon the frame, and to snap into a notch for holding it in any desired position. When this rod O' has its turned-up end or lever forced forward by the driver's foot, the wheel H is thrown out of gear with the clutch upon the shaft G and the movement of the axle D and the cutter ceases. When the cutter-bar is lowered, the driver presses backward upon this turned-up end or lever of the rod O', so as to throw the clutch into gear with the wheel H, and then the movement of the shaft D begins again.

Having thus described my invention, I claim—

1. The combination of the axle, the frame P, provided with slots Q at its rear upper corners for the passage of the axle, the shoe loosely connected to the lower end of the frame, the cutting apparatus and its operating mechanism, with the shaft or partially-turning rod R, provided with arms S, rods T, fastened to the frame, and the operating-lever for operating the rod R, substantially as described.

2. The combination of the shaft G, a loosely-revolving drum placed thereon, a clutch placed upon the shaft and adapted to engage with the drum, and a cord, wire, or chain which has one end fastened to the drum and the other connected to the operating-lever, the operating-lever, a partially-revolving shaft D', and a spring-actuated rod or lever connected to the front end of the shaft, whereby the clutch on the shaft G can be thrown into or out of gear with the drum, substantially as set forth.

3. The combination of the operating-lever Z, connected to the finger-bar, a cutter-bar, the bent rod or lever F' on the rock-shaft D', the partially-revolving shaft D', the clutch, the shaft G, the drum placed upon the shaft, and the connecting cord, wire, or chain which is connected to the lever and to the drum, substantially as specified.

4. The combination of the shoe, the finger-bar secured thereto, the lever Z, connected to the finger-bar and provided with a spring-actuated dog or pawl, the casting A', provided with teeth, the bent rod or lever F' on the rock-shaft D', the partially-revolving shaft D', the clutch, the shaft G upon which the clutch is placed, the drum, and the connecting cord, wire, or chain connected at one end to the lever and at the other to the drum, substantially as shown.

5. The combination of the drum, the drum-clutch C', the shaft G, the connecting cord, wire, or chain connecting the drum and operating-lever, the operating-lever Z, the wheel H, placed upon the shaft G, the shaft D', provided with an arm H' for operating the drum-clutch C', the endwise-moving rod O', provided with the arm Q' at one end for operating the clutch which engages with the wheel H, and the spring P', substantially as described.

In testimony whereof I affix my signature in presence of two witnesses.

JAMES I. EAVENSON.

Witnesses:
F. A. LEHMANN,
PHILIP MAURO.